(12) United States Patent
Ozer

(10) Patent No.: US 11,514,362 B2
(45) Date of Patent: Nov. 29, 2022

(54) SAFETY-BASED PREDICTION APPARATUS, SYSTEM AND METHOD

(71) Applicant: Arm Limited, Cambridge (GB)

(72) Inventor: Emre Ozer, Buckden (GB)

(73) Assignee: Arm Limited, Cambridge (GB)

( * ) Notice: Subject to any disclaimer, the term of this patent is extended or adjusted under 35 U.S.C. 154(b) by 532 days.

(21) Appl. No.: 16/665,255

(22) Filed: Oct. 28, 2019

(65) Prior Publication Data
US 2021/0125097 A1   Apr. 29, 2021

(51) Int. Cl.
| | | |
|---|---|---|
| *G06V 10/00* | (2022.01) |
| *G06N 20/00* | (2019.01) |
| *H04N 19/176* | (2014.01) |
| *H04N 19/61* | (2014.01) |
| *G06F 16/35* | (2019.01) |
| *G06K 9/62* | (2022.01) |
| *G06N 3/08* | (2006.01) |

(52) U.S. Cl.
CPC .............. *G06N 20/00* (2019.01); *G06F 16/35* (2019.01); *G06K 9/6256* (2013.01); *G06K 9/6262* (2013.01); *G06K 9/6269* (2013.01); *G06N 3/08* (2013.01); *H04N 19/176* (2014.11); *H04N 19/61* (2014.11)

(58) Field of Classification Search
CPC .. G06K 9/6256; G06K 9/6227; G06K 9/6281; G06K 9/6262; G06N 20/00; G06N 3/0454; G06N 20/20; G06N 3/08; G06V 20/56; G06V 20/58; G06V 10/96; G08G 1/0133
See application file for complete search history.

(56) References Cited

U.S. PATENT DOCUMENTS

| | | | |
|---|---|---|---|
| 2014/0114885 A1 | 4/2014 | Han et al. | |
| 2018/0307430 A1* | 10/2018 | Iturbe | G06F 11/1076 |
| 2019/0347488 A1* | 11/2019 | Timm | G06K 9/6227 |

OTHER PUBLICATIONS

Iturbe, Xabier, et al. "Addressing functional safety challenges in autonomous vehicles with the arm TCL S architecture." IEEE Design & Test 35.3 (2018): 7-14. (Year: 2018).*

(Continued)

*Primary Examiner* — Li Liu
(74) *Attorney, Agent, or Firm* — Leveque Intellectual Property Law, P.C.

(57) ABSTRACT

A safety-based prediction apparatus, system and method are provided. A machine learning hardware accelerator (MLHA) includes a main classifier (MC) module, at least one guardian classifier (GC) module, and a final predicted class decision module. The MC module predicts an MC predicted class based on input data, and includes a pre-trained, machine learning main classifier (MLMC) that has at least one safety critical (SC) class and a plurality of non-SC classes. Each guardian classifier (GC) module is associated with an SC class, and predicts a GC predicted class based on the input data. Each GC module includes a pre-trained, machine learning guardian classifier (MLGC) having two classes including an associated SC class and a residual class that includes any non-associated SC classes and the plurality of non-SC classes. A decision module determines and outputs a final predicted class based on the MC predicted class and each GC predicted class.

20 Claims, 10 Drawing Sheets

(56) References Cited

OTHER PUBLICATIONS

P. Koopman and M. Wagner, "Autonomous Vehicle Safety: An Interdisciplinary Challenge," in IEEE Intelligent Transportation Systems Magazine, vol. 9, No. 1, pp. 90-96, Spring 2017, doi: 10.1109/MITS.2016.2583491. (Year: 2017).*

M. Realpe, B. Vintimilla and L. Vlacic, "Towards fault tolerant perception for autonomous vehicles: Local fusion," 2015 IEEE 7th International Conference on Cybernetics and Intelligent Systems (CIS) and IEEE Conference on Robotics, Automation and Mechatronics (RAM), 2015, pp. 253-258 (Year: 2015).*

International Search Report and Written Opinion, PCT/GB2020/050707 (claims priority to APN U.S. Appl. No. 16/665,255), dated Jul. 9, 2020.

* cited by examiner

SAFETY-BASED PREDICTION APPARATUS, SYSTEM AND METHOD

BACKGROUND

The present disclosure relates to computer systems. More particularly, the present disclosure relates to a safety-based prediction apparatus, system and method.

Prediction is a fundamental element of many applications that include machine learning (ML) models, artificial neural networks (ANNs), convolutional neural networks (CNNs), recurrent neural networks (RNNs), Binary Neural Networks (BNN), Support Vector Machines (SVMs), Decision Trees, Naïve Bayes, etc. ML models implemented in hardware may be used in safety-critical systems for implementing critical classification tasks, particularly in autonomous vehicles, robotic medical equipment, etc. However, the inherently predictive nature of ML models never guarantees 100% prediction accuracy, which occasionally leads to incorrect predictions. ML models implemented in hardware are also prone to hard or soft errors, which may exacerbate the prediction accuracy or lead to a fatal event. For example, a transient fault in a flip-flop in the output layer of a neural network may lead the ML inference hardware to predict an incorrect classification.

Safety-critical electronic systems must guarantee functional safety that is defined as the absence of unacceptable risk due to hazards caused by malfunctioning electronic systems due to faults. The end goal of functional safety is to prevent death or injury to the people due to a failure in electronic systems used in a smart autonomous device (e.g. an autonomous vehicle or a robot). Safety-critical systems now include pattern recognition hardware that heavily relies on predictive ML algorithms to recognize objects and people around them. Functional safety must also deal with the non-malfunctioning errors caused by mispredictions by the ML algorithms running on the hardware.

DETAILED DESCRIPTION

Figure 1:
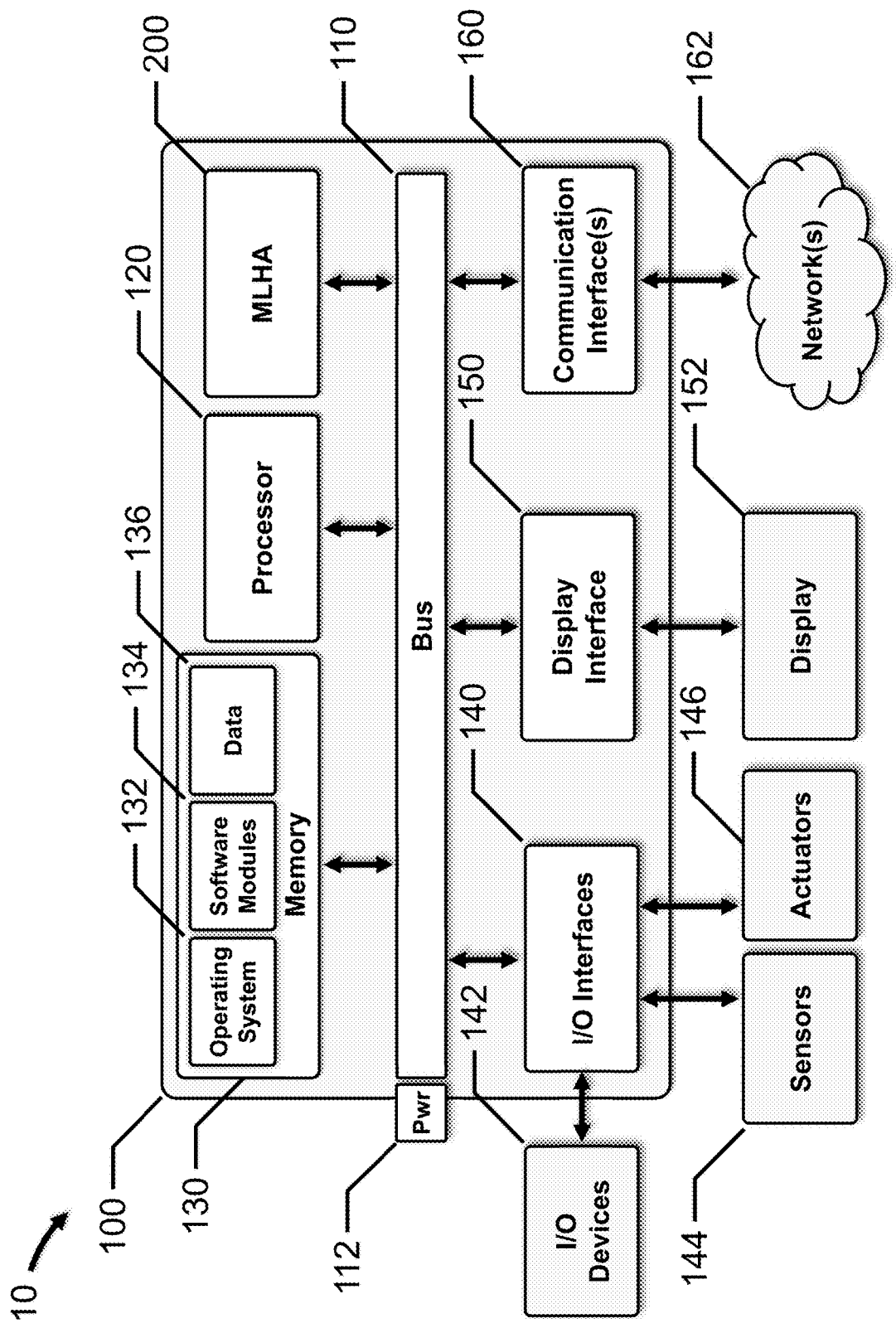
FIG. 1 depicts a block diagram of a system with a machine learning hardware accelerator (MLHA), in accordance with an embodiment of the present disclosure.

Embodiments of the present disclosure will now be described with reference to the drawing figures, in which like reference numerals refer to like parts throughout.

Embodiments of the present disclosure provide a system, apparatus and method that advantageously include a safety-critical attribute within the classes to be predicted by a classification-based ML model to improve the resilience of the MLHA implementing the ML model in a safety-critical system. More particularly, a safety-critical (SC) class is a class associated with an entity, such as, for example, a human, an animal, an object, etc., that is to be recognized by a predictive ML algorithm that is run on the safety-critical system where a misprediction of the class may lead to death or injury.

In one embodiment, an MLHA includes a main classifier (MC) module, a guardian classifier (GC) module associated with each SC class, and a final predicted class (FPC) decision module.

The MC module includes a pre-trained, machine learning main classifier (MLMC) having at least one SC class and a plurality of non-SC classes. The MC module is configured to predict an MC predicted class based on input data, and output the MC predicted class.

Each GC module includes a pre-trained, machine learning guardian classifier (MLGC) having two classes including an associated SC class and a residual class that includes any class other than the associated SC class, i.e., any non-associated SC classes and the plurality of non-SC classes. Each GC module is configured to predict a GC predicted class based on the input data, and output the GC predicted class.

The FPC decision module is coupled to the MC module and each GC module. The FPC decision module is configured to receive the MC predicted class and each GC predicted class, determine a final predicted class based on the MC predicted class and each GC predicted class, and output the final predicted class.

An ML model is a mathematical model that is trained by a learning process to generate an output, such as a supervisory signal, from an input, such as a feature vector. Neural networks, such as ANNs, CNNs, RNNs, BNNs, etc., Support Vector Machines, Naïve Bayes and K-Nearest Neighbor classifiers are types of ML models. For example, a supervised learning process trains an ML model using completely-labeled training data that include known input-output pairs. A semi-supervised or weakly-supervised learning process trains the ML model using incomplete training data, i.e., a small amount of labeled data (i.e., input-output pairs) and a large amount of unlabeled data (input only). An unsupervised learning process trains the ML model using unlabeled data (i.e., input only).

An ANN models the relationships between input data or signals and output data or signals using a network of interconnected nodes that is trained through a learning process described above. The nodes are arranged into various layers, including, for example, an input layer, one or more hidden layers, and an output layer. The input layer receives input data, such as, for example, image data, and the output layer generates output data, such as, for example, a probability that the image data contains a known object. Each hidden layer provides at least a partial transformation of the input data to the output data. A deep neural network (DNN) has multiple hidden layers in order to model complex, nonlinear relationships between input data and output data.

In a fully-connected, feedforward ANN, each node is connected to all of the nodes in the preceding layer, as well as to all of the nodes in the subsequent layer. For example, for a simple ANN with an input layer, one hidden layer and an output layer, each input layer node is connected to each hidden layer node, each hidden layer node is connected to each input layer node and each output layer node, and each output layer node is connected to each hidden layer node.

For more complicated ANNs with multiple hidden layers, each additional hidden layer is similarly connected to all of the nodes in the preceding hidden layer, as well as to all of the nodes in the subsequent hidden layer. Each connection has a weight value, and each node has an activation function, such as, for example, a linear function, a step function, a sigmoid function, a tanh function, a rectified linear unit (ReLu) function, etc., that determines the output of the node based on the weighted sum of the inputs to the node. The input data propagates from the input layer nodes, through respective connection weights to the hidden layer nodes, and then through respective connection weights to the output layer nodes.

More particularly, at each input node, input data is provided to the activation function for that node, and the output of the activation function is then provided as an input data value to each hidden layer node. At each hidden layer node, the input data value received from each input layer node is multiplied by a respective connection weight, and the resulting products are summed or accumulated into an activation signal value that is provided to the activation function for that node. The output of the activation function is then provided as an input data value to each output layer node. At each output layer node, the output data value received from each hidden layer node is multiplied by a respective connection weight, and the resulting products are summed or accumulated into an activation signal value that is provided to the activation function for that node. The output of the activation function is then provided as output data. Additional hidden layers may be similarly configured to process data.

Training an ANN includes optimizing the connection weights between nodes by minimizing the prediction error of the output data until the ANN achieves a particular level of accuracy. One method is backpropagation, or backward propagation of errors, which iteratively and recursively determines a gradient descent with respect to the connection weights, and then adjusts the connection weights to improve the performance of the network.

A multi-layer perceptron (MLP) is a fully-connected ANN that has an input layer, an output layer and one or more hidden layers, and uses a non-linear activation function to classify data that is not linearly separable. MLPs may be used for natural language processing applications, such as machine translation, speech recognition, etc. A CNN is a variation of an MLP that has an input layer, an output layer and multiple hidden layers, including a series of convolutional layers, followed by pooling layers, fully-connected layers, and normalization layers. Each convolutional layer applies a sliding dot product or cross-correlation to the input data, and then transmits the results to the next layer. To take advantage of spatially-local patterns in the input data, certain hidden layers of a CNN may not be fully-connected. Instead, the nodes in these hidden layer are connected to a small number of nodes in the preceding hidden layer. Locally-connected and completely-connected hidden layers are combined to form the CNN architecture. CNNs may be used for classification, recognition, prediction, etc. applications, such as image classification, speech recognition, etc. Other ANNs include long short-term memories (LSTMs), sequence-to-sequence models that include an encoder RNN and a decoder RNN, shallow neural networks, etc.

Many ML inference hardware implementations use classification-based ML models, such as ANNs, CNNs, RNNs, etc., to perform pattern recognition (e.g. image, speech, activity, etc.). Typical classification-based ML models have a finite set of classes to predict. For example, in the case of an autonomous vehicle, the set of image classes may include, for example, "pedestrian," "bicycle," "vehicle," "animal," "traffic sign," "traffic light," "junction," "exit," "litter," etc. Some of these classes are extremely critical to predict in real time; otherwise, an incorrect prediction may lead to an injury or death. For example, "pedestrian," "bicycle," "vehicle," etc. may be defined as safety-critical classes, while "animal," "traffic sign," "traffic light," "junction," "exit," "litter," etc. are not defined as safety-critical.

ML inference hardware may also implement other types of ML models, such as, for example, Support Vector Machines, Decision Trees, Gaussian Naïve Bayes, etc.

FIG. 1 depicts a block diagram of system with an MLHA, in accordance with an embodiment of the present disclosure.

Computer 100 includes bus 110 coupled to one or more processors 120, memory 130, I/O interfaces 140, display interface 150, one or more communication interfaces 160 and one or more MLHAs 200. Generally, I/O interfaces 140 are coupled to I/O devices 142, sensors 144 and actuators 146 using a wired or wireless connection, display interface 150 is coupled to display 152, and communication interface 160 is connected to network 162 using a wired or wireless connection.

Bus 110 is a communication system that transfers data between processor 120, memory 130, I/O interfaces 140, display interface 150, communication interface 160, MLHA 200, as well as other components not depicted in FIG. 1. Power connector 112 is coupled to bus 110 and a power supply (not shown).

Processor 120 includes one or more general-purpose or application-specific microprocessors that executes instructions to perform control, computation, input/output, etc. functions for computer 100. Processor 120 may include a single integrated circuit, such as a micro-processing device, or multiple integrated circuit devices and/or circuit boards working in cooperation to accomplish the functions of processor 120. In addition, processor 120 may execute computer programs or modules, such as operating system 132, software modules 134, etc., stored within memory 130. For example, software modules 134 may include an autonomous vehicle application, a robotic application, such as, for example, a robot performing a surgical process, working with humans in a collaborative environment, etc.

Generally, storage element or memory 130 stores instructions for execution by processor 120 and data. Memory 130 may include a variety of non-transitory computer-readable medium that may be accessed by processor 120. In various embodiments, memory 130 may include volatile and non-volatile medium, non-removable medium and/or removable medium. For example, memory 130 may include any combination of random access memory (RAM), dynamic RAM (DRAM), static RAM (SRAM), read only memory (ROM), flash memory, cache memory, and/or any other type of non-transitory computer-readable medium.

Memory 130 contains various components for retrieving, presenting, modifying, and storing data. For example, memory 130 stores software modules that provide functionality when executed by processor 120. The software modules include operating system 132 that provides operating system functionality for computer 100. Software modules 134 provide various functionality, as noted above. Data 136 may include data associated with operating system 132, software modules 134, etc.

I/O interfaces 140 are configured to transmit and/or receive data from I/O devices 142, sensors 144 and actuators 146. I/O interfaces 140 enable connectivity between processor 120 and I/O devices 142 by encoding data to be sent from processor 120 to I/O devices 142, and decoding data received from I/O devices 142 for processor 120. Generally, data may be sent over wired and/or wireless connections. For example, I/O interfaces 140 may include one or more wired communications interfaces, such as USB, Ethernet, etc., and/or one or more wireless communications interfaces, coupled to one or more antennas, such as WiFi, Bluetooth, cellular, etc.

Generally, I/O devices 142 provide input to computer 100 and/or output from computer 100. As discussed above, I/O devices 142 are operably connected to computer 100 using a wired and/or wireless connection. I/O devices 142 may include a local processor coupled to a communication interface that is configured to communicate with computer 100 using the wired and/or wireless connection. For example, I/O devices 142 may include a keyboard, mouse, touch pad, joystick, etc.

Display interface 150 is configured to transmit image data from computer 100 to monitor or display 152.

Communication interface 160 is configured to transmit data to and from network 162 using one or more wired and/or wireless connections. Network 162 may include one or more local area networks, wide area networks, the Internet, etc., which may execute various network protocols, such as, for example, wired and/or wireless Ethernet, Bluetooth, etc. Network 162 may also include various combinations of wired and/or wireless physical layers, such as, for example, copper wire or coaxial cable networks, fiber optic networks, Bluetooth wireless networks, WiFi wireless networks, CDMA, FDMA and TDMA cellular wireless networks, etc.

MLHA 200 is configured to execute classification-based ML models, such as, for example, ANNs, CNNs, RNNs, SVM, Naïve Bayes etc., in support of software modules 134. Generally, MLHA 200 may be a graphics processing unit (GPU), a digital signal processor (DSP), a neural processing unit (NPU), such as, for example, the ARM Machine Learning Processor or a custom-designed processing engine executing the underlying ML inference algorithm. MLHA 200 may also be an application-specific integrated circuit (ASIC), or a custom processor implemented onto a field-programmable gate array (FPGA), etc. Accordingly, MLHA 200 may include one or more processors, microprocessors, microcontrollers, etc., one or more memory blocks including RAM, ROM, EEPROM, flash memory, etc., integrated circuits, programmable circuits, matrix multiply accelerators, etc. For example, a matrix multiply accelerator may include an NxN systolic array of multiply and accumulate (MAC) cells and supporting memory registers and control circuitry, that supports fast, dense matrix-matrix and matrix-vector operations.

Embodiments of the present disclosure advantageously include an SC attribute for each class to be predicted by the classification-based ML models hosted by MLHA 200. In other words, each class is categorized as an SC class or a non-SC class. This safety-critical class architecture improves the resilience of MLHA 200 in a safety-critical system, strengthens the prediction accuracy of the classes whose safety-critical attribute is set, and detects potential hardware-related errors. Known classification-based ML models, such as CNNs, DNNs, etc., are trained in such a way that all classes are treated equally. When a classification-based ML model is implemented in a hardware accelerator, such as MLHA 200, the overall class prediction accuracy is the main performance metric. However, when MLHA 200 is used in a safety-critical system, the prediction of some classes, i.e., the SC classes, becomes more critical than others, i.e., the non-SC classes. So, the classification-based ML models for safety-critical systems are trained in such a way that all classes are not treated equally. Additionally, SC classes may have different priority levels of criticality, e.g. the "pedestrian" class may have a higher priority level than a "traffic sign" class.

The classification-based ML models hosted by MLHA 200 include an MC module and a GC module associated with each SC class. The MC module includes a pre-trained MLMC having at least one SC class and a plurality of non-SC classes. The MC module is configured to predict an MC predicted class based on input data, and output the MC predicted class. Each GC module includes a pre-trained MLGC that has two classes including an associated SC class and a residual class. The residual class includes any non-associated SC classes and the plurality of non-SC classes. Each GC module is configured to predict a GC predicted class based on the input data, and output the GC predicted class. In other words, each GC is a binary classifier that either predicts the associated SC class or not.

Importantly, each MLGC may be implemented using a simpler ML model than the MLMC. For example, MLHA 200 may implement the MLMC as a CNN and each MLGC as a Naïve Bayes, etc. Each MLGC is trained using the same datasets as the MLMC, but the labels within the training data are collapsed to the associated SC class label (e.g., 1) or the residual class label (e.g., 0). Because the MLGC solves a binary classification problem, the prediction accuracy may be as high as the CNN, while the cost for implementing the additional MLGCs are low.

FIGS. 2A, 2B, 2C and 2D depict block diagrams of an MLHA, in accordance with embodiments of the present disclosure.

Figure 2A:
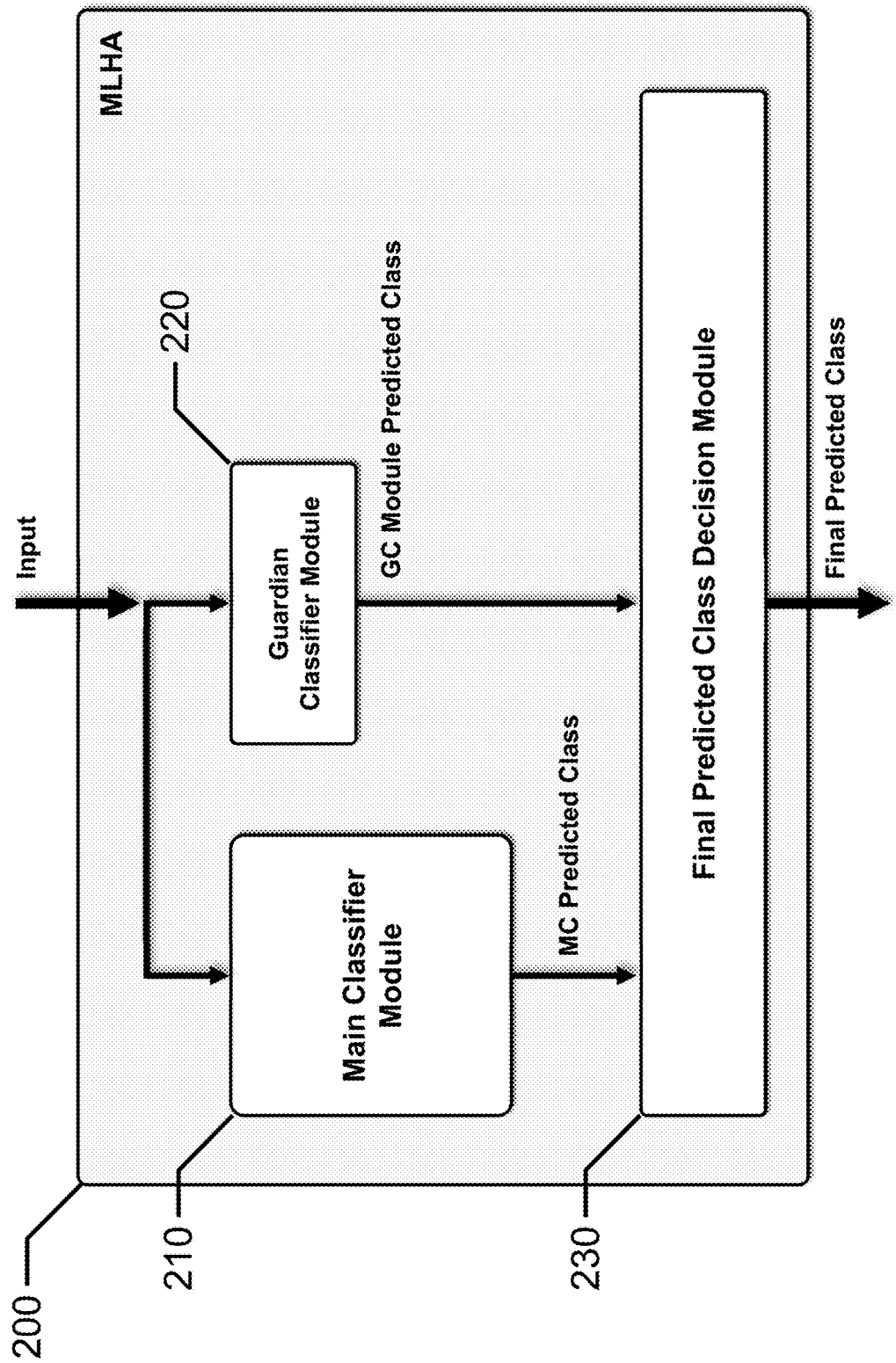
FIGS. 2A, 2B, 2C and 2D depict block diagrams of an MLHA, in accordance with embodiments of the present disclosure.

FIG. 2A depicts an embodiment of MLHA 200 that includes MC module 210, GC module 220, and FPC decision module 230.

MC module 210 includes a pre-trained MLMC that has one SC class (e.g., "pedestrian") and several non-SC classes (e.g., "bicycle," "vehicle," "animal," "traffic sign," "traffic light," "junction," "exit," "litter," etc.). MC module 210 is configured to predict an MC predicted class based on the input, and output the MC predicted class.

GC module 220 includes a pre-trained MLGC that has two classes including an associated SC class (e.g., "pedestrian") and a residual class that includes the non-SC classes (e.g., "bicycle" "vehicle," "animal," "traffic sign," "traffic light," "junction," "exit," "litter," etc.). GC module 220 is configured to predict a GC predicted class based on the input data, and output the GC predicted class to FPC decision module 230.

At every prediction, the same input is sent to MC module 210 and GC module 220, and FPC decision module 230 determines the final predicted class, which is described in more detail below.

Figure 2B:
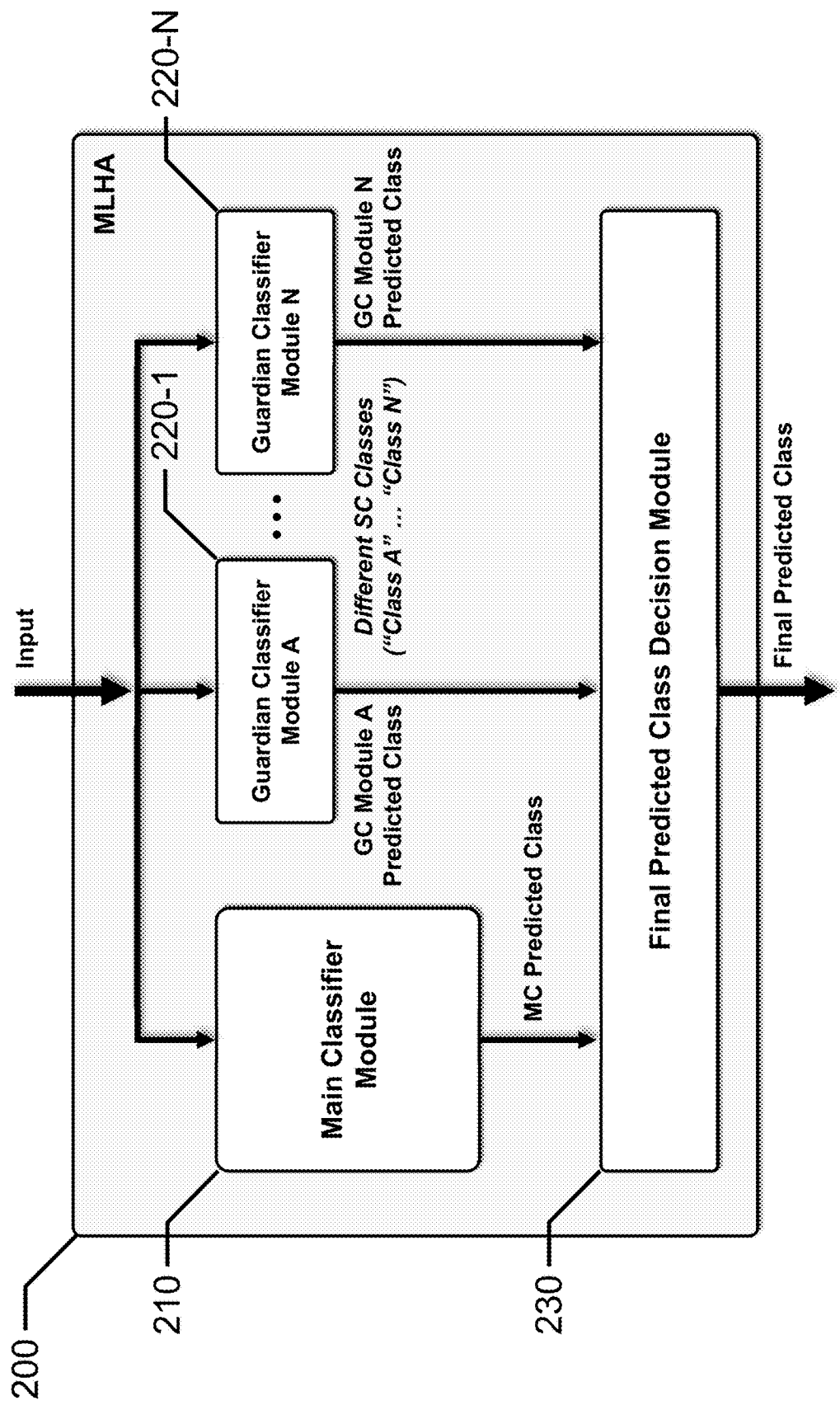

FIG. 2B depicts an embodiment of MLHA 200 that includes MC module 210, GC modules 220-1 to 220-N, and FPC decision module 230. Each GC module 220-1 to 220-N is associated with a different SC class.

MC module 210 includes a pre-trained MLMC that has a number, N, of SC classes and several non-SC classes. In one example, N equals 2, the SC classes are "pedestrian" and "bicycle," and the non-SC classes are "vehicle," "animal," "traffic sign," "traffic light," "junction," "exit," "litter," etc. MC module 210 is configured to predict an MC predicted class based on the input, and output the MC predicted class.

Each GC module 220-1 to 220-N includes a pre-trained MLGC that has two classes including an associated SC class and a residual class that includes any non-associated SC classes and the non-SC classes. In the above example, for GC module 220-1, the associated SC class includes "pedestrian," and the residual class includes "bicycle," "vehicle," "animal," "traffic sign," "traffic light," "junction," "exit," "litter," etc. Similarly, for GC module 220-N, the associated SC class includes "bicycle," and the residual class includes "pedestrian," "vehicle," "animal," "traffic sign," "traffic light," "junction," "exit," "litter," etc. Each GC module 220-1 to 220-N is configured to predict a GC predicted class based on the input data, and output the GC predicted class to FPC decision module 230.

At every prediction, the same input is sent to MC module 210 and GC modules 220-1 to 220-N, and FPC decision module 230 determines the final predicted class, which is described in more detail below.

Figure 2C:
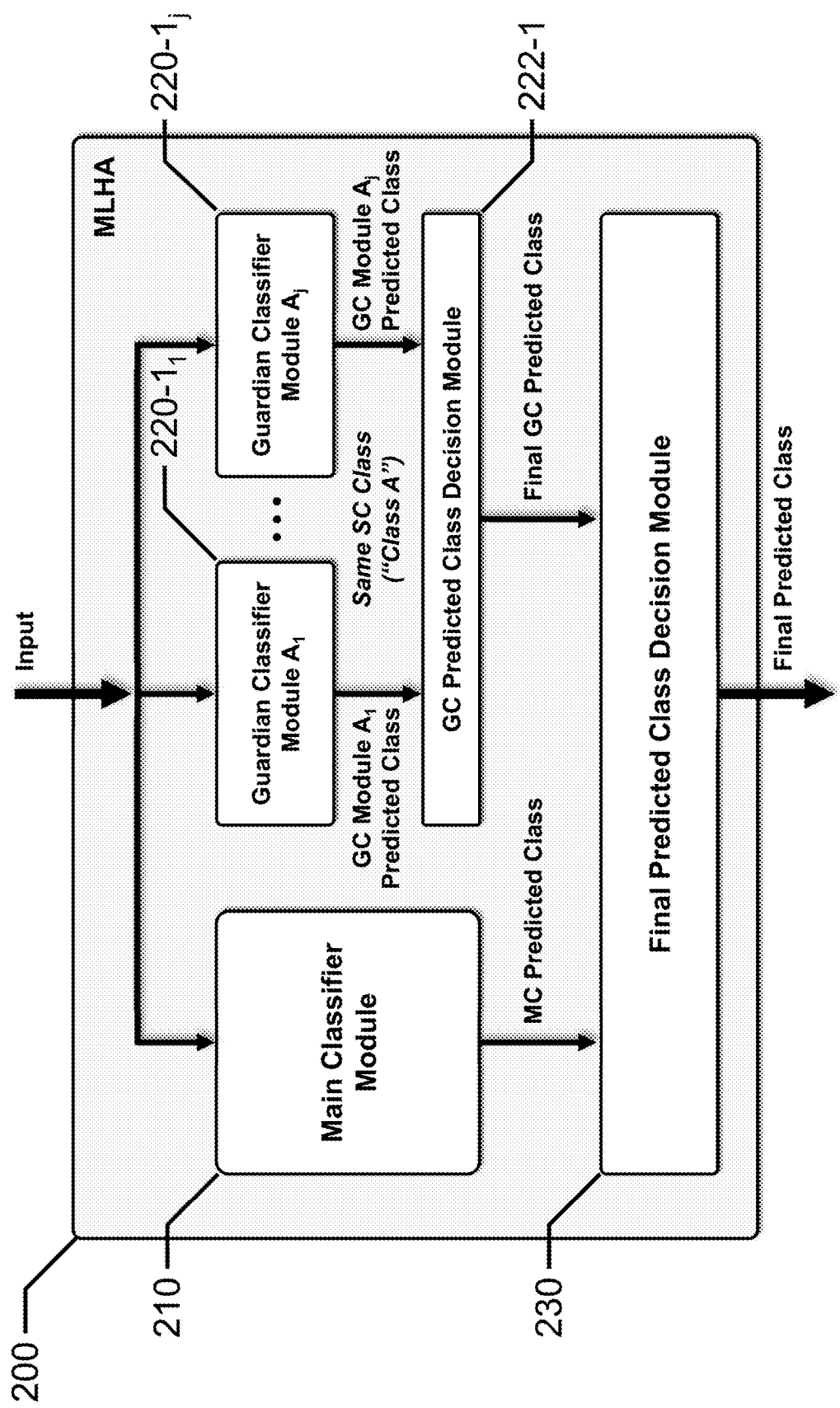

FIG. 2C depicts an embodiment of MLHA 200 that includes MC module 210, GC modules $220\text{-}1_1$ to $220\text{-}1_j$, GC predicted class decision module 222-1, and FPC decision module 230. Each GC module $220\text{-}1_1$ to $220\text{-}1_j$ is associated with the same SC class.

MC module 210 includes a pre-trained MLMC that has one SC class (e.g., "pedestrian") and several non-SC classes (e.g., "bicycle," "vehicle," "animal," "traffic sign," "traffic light," "junction," "exit," "litter," etc.). MC module 210 is configured to predict an MC predicted class based on the input, and output the MC predicted class.

Each GC module $220\text{-}1_1$ to $220\text{-}1_j$ includes the same pre-trained MLGC that has two classes including the same associated SC class (e.g., "pedestrian") and a residual class that includes the non-SC classes (e.g., "bicycle," "vehicle," "animal," "traffic sign," "traffic light," "junction," "exit," "litter," etc.). Each GC module $220\text{-}1_1$ to $220\text{-}1_j$ is configured to predict a GC predicted class based on the input data, and output the GC predicted class to GC predicted class decision module 222-1.

At every prediction, the same input is sent to MC module 210 and GC modules $220\text{-}1_1$ to $220\text{-}1_j$, GC predicted class decision module 222-1 determines and outputs the final GC predicted class to FPC decision module 230, which determines the final predicted class.

In one embodiment, when at least half of the GC predicted classes are the SC class, GC predicted class decision module 222-1 selects the SC class as the final GC predicted class, and, when less than half of the GC predicted classes are the SC class, GC predicted class decision module 222-1 selects the residual class as the final GC predicted class.

Figure 2D:
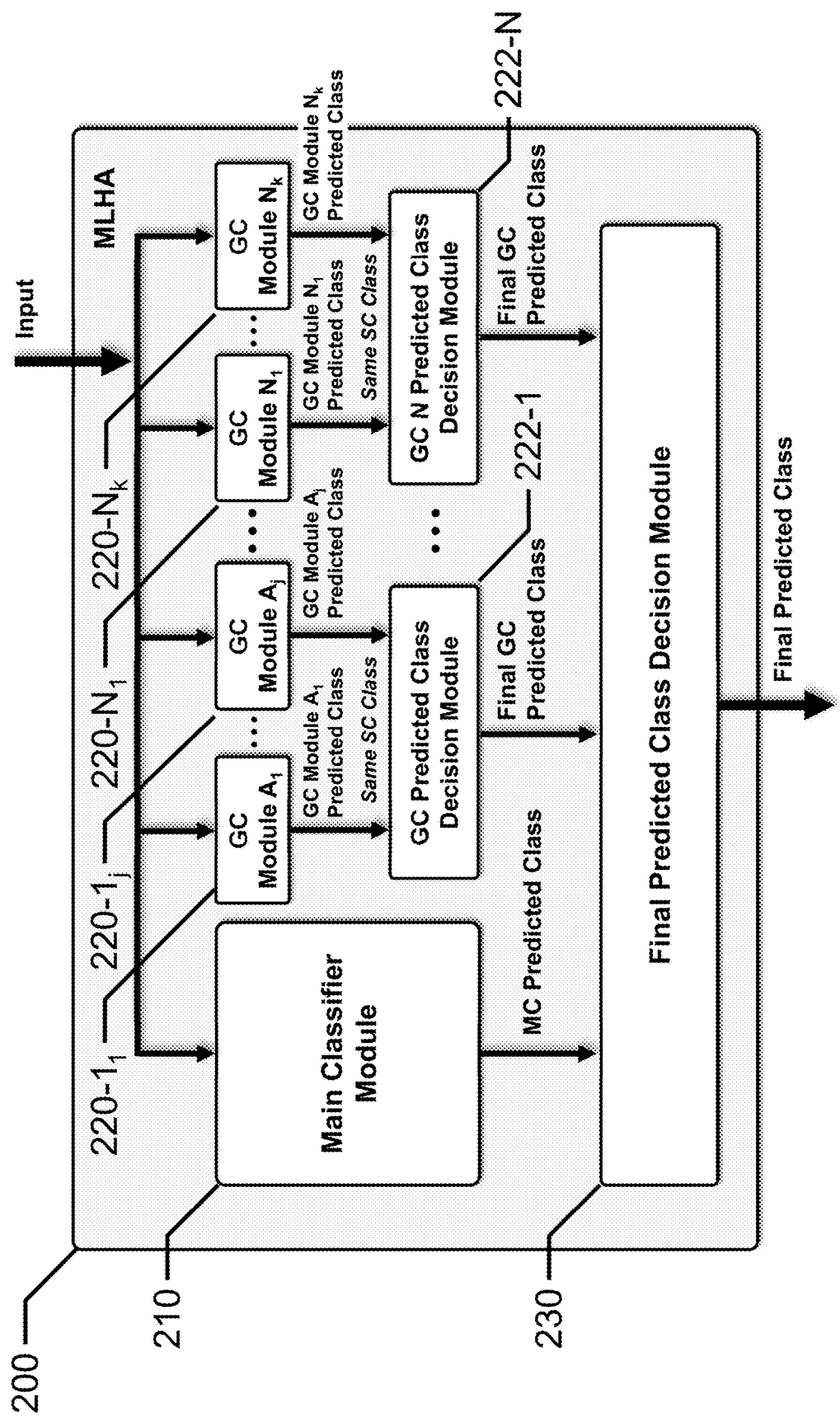

FIG. 2D depicts an embodiment of MLHA 200 that includes MC module 210, several sets of GC modules, and FPC decision module 230. Due to the low area and power requirements of each GC module 220, multiple, voting-redundant GC modules 220 for each SC class may be trained and implemented by MLHA 200 in order to increase the redundancy and error tolerance.

MC module 210 includes a pre-trained MLMC that has a number, N, of SC classes and several non-SC classes. In one example, N equals 2, the SC classes are "pedestrian" and "bicycle," and the non-SC classes are "vehicle," "animal," "traffic sign," "traffic light," "junction," "exit," "litter," etc. MC module 210 is configured to predict an MC predicted class based on the input, and output the MC predicted class.

Each GC module set includes several GC modules and a GC predicted class decision module. For example, the first set of GC modules includes GC modules $220\text{-}1_1$ to $220\text{-}1_j$ and GC predicted class decision module 222-1, while the last set of GC modules includes GC modules $220\text{-}N_1$ to $220\text{-}N_k$ and GC predicted class decision module 222-N. Each set of GC modules is associated with a different SC class, e.g., GC modules $220\text{-}1_1 \ldots 220\text{-}1_j$ are associated with an "A" class, GC modules $220\text{-}N_1 \ldots 220\text{-}N_k$ are associated with an "N" class, etc. In the above example, the "A" class is "pedestrian," and the "N" class is "bicycle."

Each GC module $220\text{-}1_1$ to $220\text{-}1_j$ includes the same pre-trained MLGC that has two classes including the same associated SC class (the "A" class, e.g., "pedestrian") and a residual class that includes any non-associated SC classes (the "N" class, e.g., "bicycle") and the non-SC classes (e.g., "vehicle," "animal," "traffic sign," "traffic light," "junction," "exit," "litter," etc.). Each GC module $220\text{-}1_1$ to $220\text{-}1_j$ is configured to predict a GC predicted class based on the input data, and output the GC predicted class.

Similarly, each GC module $220\text{-}N_1$ to $220\text{-}N_k$ includes the same pre-trained MLGC that has two classes including the same associated SC class (the "N" class, e.g., "bicycle") and a residual class that includes any non-associated SC classes (the "A" class, e.g., "pedestrian") and the non-SC classes (e.g., "vehicle," "animal," "traffic sign," "traffic light," "junction," "exit," "litter," etc.). Each GC module $220\text{-}N_1$ to $220\text{-}N_k$ is configured to predict a GC predicted class based on the input data, and output the GC predicted class.

At every prediction, the same input is sent to MC module 210 and all of the GC module sets, i.e., GC modules $220\text{-}1_1$ to $220\text{-}1_j, \ldots$, GC module $220\text{-}N_1$ to $220\text{-}N_k$, all of the GC predicted class decision modules determine the respective GC predicted classes, i.e., GC predicted class decision module 222-1 determines and outputs the final GC predicted class (the "A" class) to FPC decision module 230, GC predicted class decision module 222-N determines and outputs the final GC predicted class (the "N" class) to FPC decision module 230, etc., and FPC decision module 230 determines the final predicted class, which is described in more detail below.

In one embodiment, when at least half of the GC predicted classes are the SC class, GC predicted class decision module 222-1 selects the SC class as the final GC predicted class, and, when less than half of the GC predicted classes are the SC class, GC predicted class decision module 222-1 selects the residual class as the final GC predicted class. Similarly, when at least half of the GC predicted classes are the SC class, GC predicted class decision module 222-N selects the SC class as the final GC predicted class, and, when less than half of the GC predicted classes are the SC class, GC predicted class decision module 222-N selects the residual class as the final GC predicted class.

Figure 3:
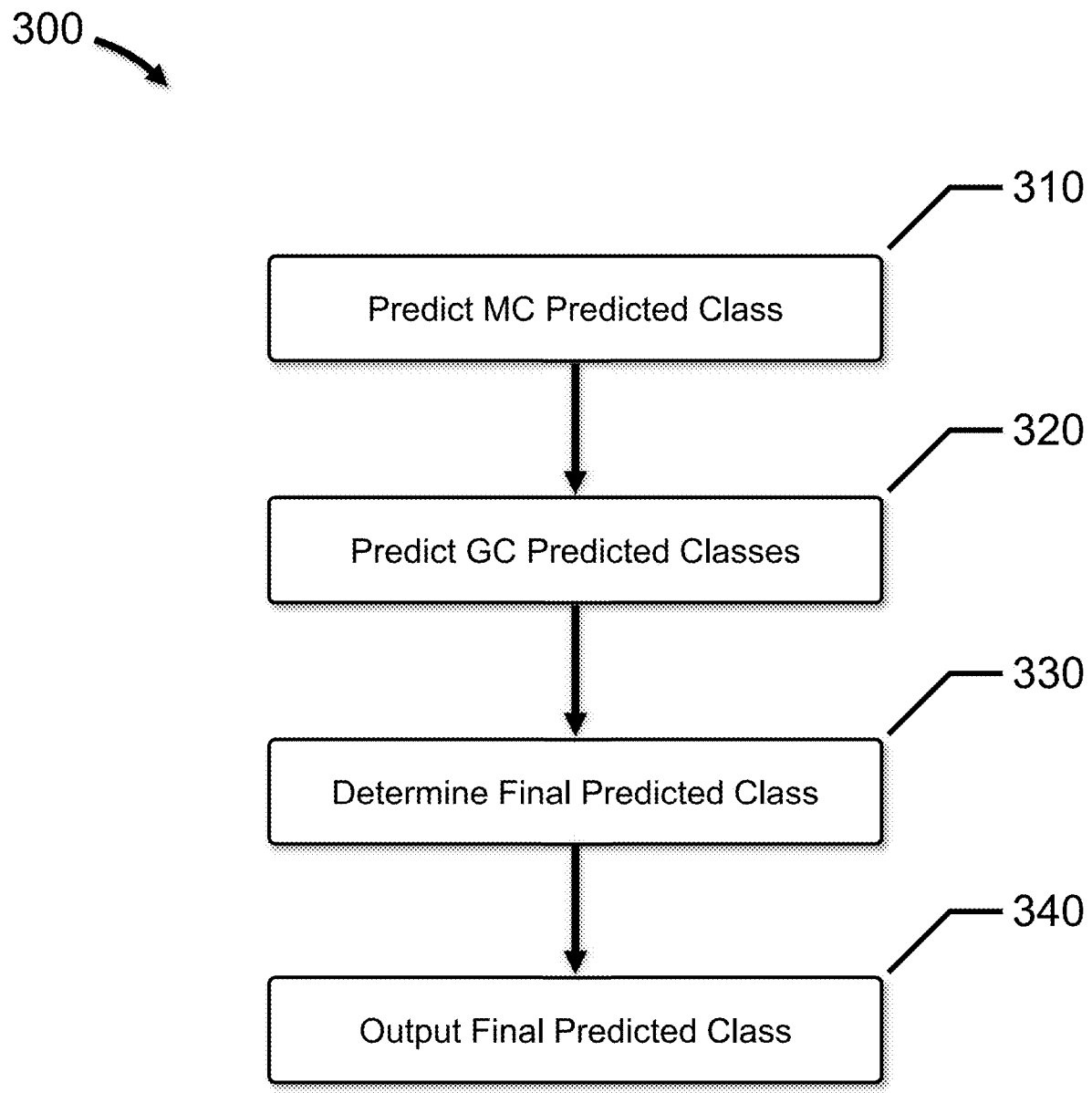
FIG. 3 depicts a flow diagram presenting functionality for a safety-based prediction process, in accordance with an embodiment of the present disclosure.

FIG. 3 depicts a flow diagram presenting functionality for a safety-based prediction process, in accordance with an embodiment of the present disclosure.

At 310, an MC predicted class is predicted by MC module 210 based on input data. As described above, MC module 210 includes a pre-trained, MLMC that has at least one SC class and a plurality of non-SC classes.

At 320, a GC predicted class is predicted by each GC module 210-1 to 210-N associated with each SC class based on the input data. As described above, each GC module 210-1 to 210-N includes a pre-trained, MLGC having two classes including an associated SC class and a residual class that includes any non-associated SC classes and the plurality of non-SC classes.

At 330, a final predicted class is determined by FPC decision module 230 based on the MC predicted class and each GC predicted class. In certain embodiments discussed above, each GC predicted class is the final GC predicted class output by GC predicted class decision module 222-1 to 222-N.

At 340, the final predicted class is output by FPC decision module 230.

Figure 4A:
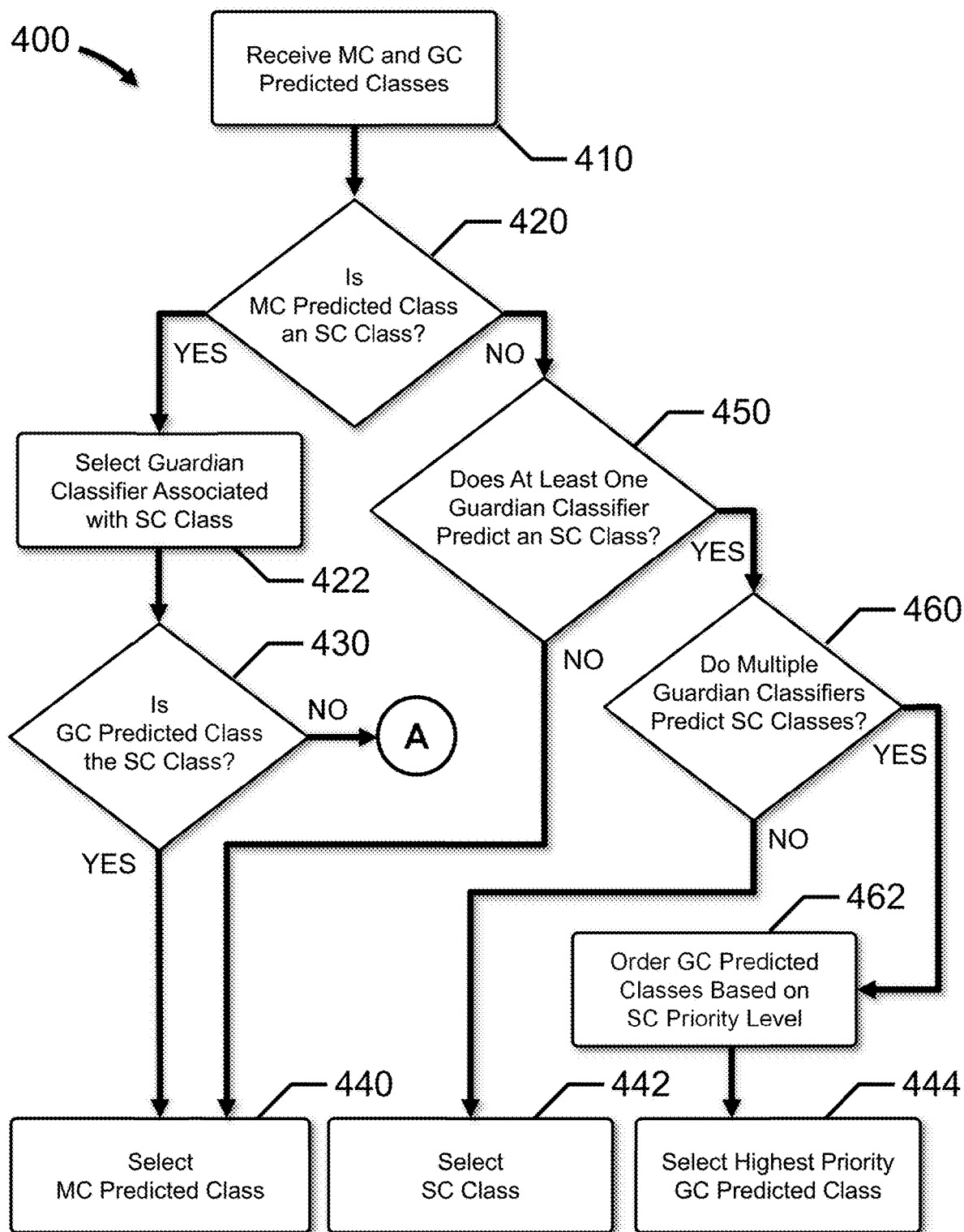
FIGS. 4A and 4B depict decision flow diagrams for determining a final predicted class, in accordance with an embodiment of the present disclosure.
Figure 4B:
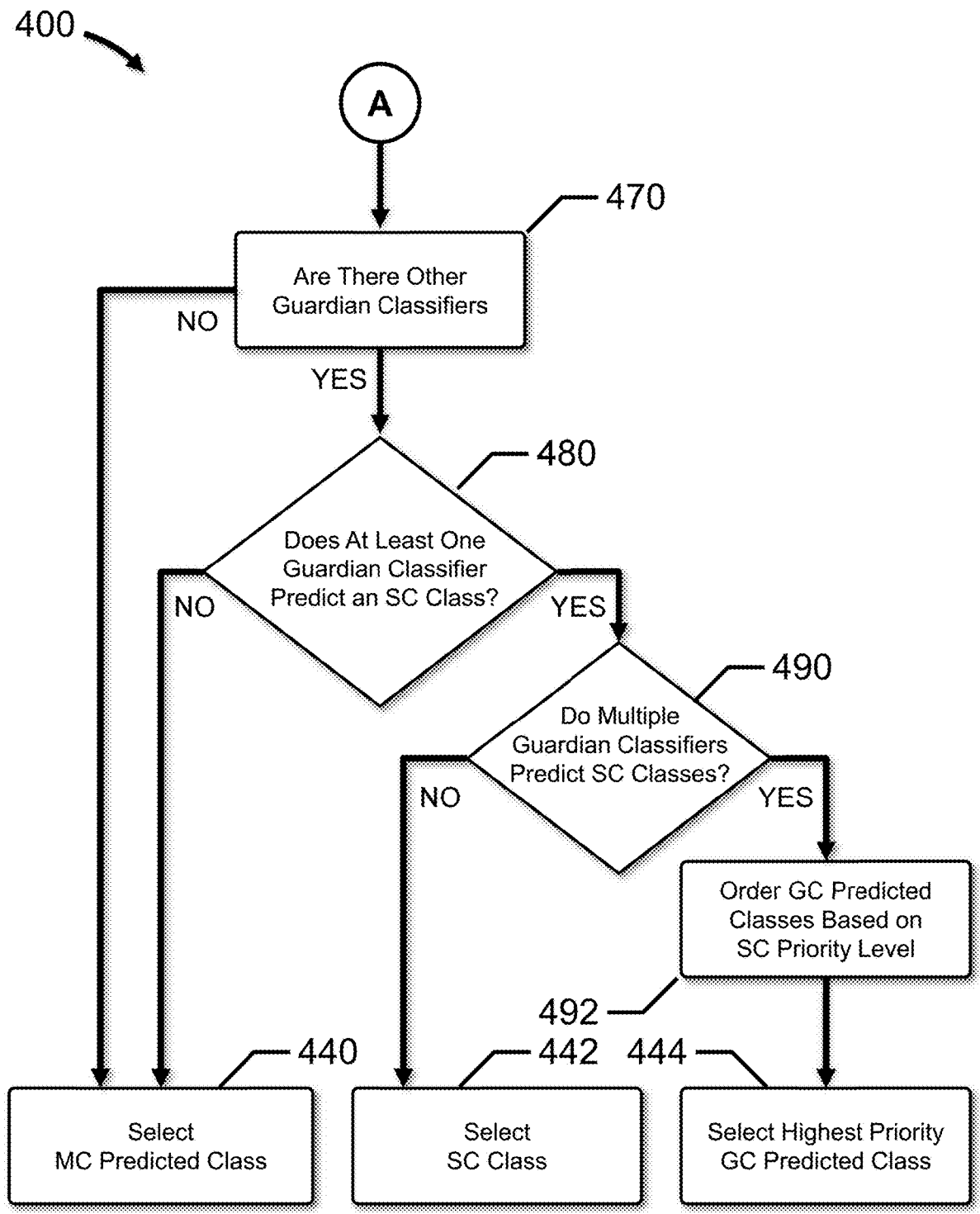

FIGS. 4A and 4B depict decision flow diagrams for determining a final predicted class, in accordance with an embodiment of the present disclosure.

At 410, the MC predicted class and each GC predicted class is received by FPC decision module 230. In certain embodiments discussed above, each final GC predicted class is received by FPC decision module 230.

At 420, FPC decision module 230 determines whether the MC predicted class is an SC class. If so, flow proceeds to 422; if not, flow proceeds to 450.

At 422, FPC decision module 230 selects the GC module 220 associated with the SC class identified by the MC predicted class. In the examples discussed above, if the MC predicted class is "pedestrian," then GC module 220-1 is selected. Similarly, if the MC predicted class is "bicycle," then GC module 220-N is selected. And so on.

At 430, FPC decision module 230 determines whether the GC predicted class from the selected GC module 220 is an SC class. If so, flow proceeds to 440; if not, flow proceeds to 470 (FIG. 4B). In the examples discussed above, if the MC predicted class is "pedestrian," and the GC predicted class from GC module 220-1 is "pedestrian," then flow proceeds to 440. Similarly, if the MC predicted class is "bicycle," and the GC predicted class from GC module 220-1 is "bicycle," then flow proceeds to 440. And so on.

At 440, FPC decision module 230 selects the MC predicted class (i.e., the SC class) for output.

In other words, when the MLMC has several SC classes, the MC predicted class is a first SC class and the GC predicted class from the GC module associated with the first SC class is the first SC class, FPC decision module 230 selects the first SC class as the final predicted class.

At 450, the MC predicted class is a non-SC class, and FPC decision module 230 determines whether at least one GC predicted class includes an SC class. If so, flow proceeds to 460; if not, flow proceeds to 440 where FPC decision module 230 selects the MC predicted class (i.e., the SC class) for output.

At 460, FPC decision module 230 determines whether multiple GC predicted classes include SC classes. If so, flow proceeds to 462; if not, flow proceeds to 442 where FPC decision module 230 selects the GC predicted class that includes the SC class for output.

At 462, FPC decision module 230 orders the multiple GC predicted classes based on SC priority level, and flow proceeds to 444 where FPC decision module 230 selects the GC predicted class that has the highest SC priority level for output.

In other words, when the MC predicted class is one of the non-SC classes, FPC decision module 230 selects the MC predicted class as the final predicted class when all of the GC predicted classes are residual classes, FPC decision module 230 selects the GC predicted class as the final predicted class when the GC predicted class is an SC class and any remaining GC predicted classes are residual classes, and FPC decision module 230 selects the GC predicted class having the highest SC priority level as the final predicted class when two or more GC predicted classes are SC classes.

At 470, the MC predicted class is an SC class, the GC predicted class from the GC module associated with the SC class is the residual class, and FPC decision module 230 determines whether other GC predicted classes are available. If so, flow proceeds to 480; if not, flow proceeds to 440 where FPC decision module 230 selects the MC predicted class (i.e., the SC class) for output.

At 480, FPC decision module 230 determines whether at least one other GC predicted class includes an SC class. If so, flow proceeds to 490; if not, flow proceeds to 440 where FPC decision module 230 selects the MC predicted class (i.e., the SC class) for output.

At 490, FPC decision module 230 determines whether multiple GC predicted classes include SC classes. If so, flow proceeds to 492; if not, flow proceeds to 442 where FPC decision module 230 selects the GC predicted class that includes the SC class for output.

At 492, FPC decision module 230 orders the multiple GC predicted classes based on SC priority level, and flow proceeds to 444 where FPC decision module 230 selects the GC predicted class that has the highest SC priority level for output.

In other words, when the MC predicted class is a first SC class and the GC predicted class from the GC module associated with the first SC class is the residual class, FPC decision module 230 selects the MC predicted class as the final predicted class when the GC predicted classes from the GC modules not associated with the first SC class are residual classes, FPC decision module 230 selects a second SC class as the final predicted class when the GC predicted class from one of the GC modules not associated with the first SC class is the second SC class and any remaining GC predicted classes are residual classes, and FPC decision module 230 selects the GC predicted class having the highest SC priority level as the final predicted class when the GC predicted classes from two or more of the GC modules not associated with the first SC class are SC classes.

Generally, after the architectures of the MLMC and each MLGC have been designed, including, for example, the input, hidden and output layers of an ANN, the convolutional, pooling, fully-connected, and normalization layers of a CNN, the fully-connected and binary activation layers of a BNN, the SVM classifiers, etc., the MLMC and each MLGC are rendered in software in order to train the weights/parameters within the various classification layers. The resulting pre-trained MLMC and each pre-trained MLGC may be implemented by MLHA 200 in several ways. For an MLHA 200 that includes one or more processors, microprocessors, microcontrollers, etc., such as, for example, a GPU, a DSP, an NPU, etc., the pre-trained MLMC software implementation and each pre-trained MLGC software implementation are adapted and optimized to run on the local processor. In these examples, the MC module, the GC modules and the FPC decision module are software modules. For an MLHA 200 that includes programmable circuitry, such as an ASIC, an FPGA, etc., the programmable circuitry is programmed to implement the pre-trained MLMC software implementation and each pre-trained MLGC software implementation. In these examples, the MC module, the GC modules and the FPC decision module are hardware modules. Regardless of the specific implementation, MLHA 200 provides hardware-based acceleration for the MLMC and each MLGC.

Figure 5A:
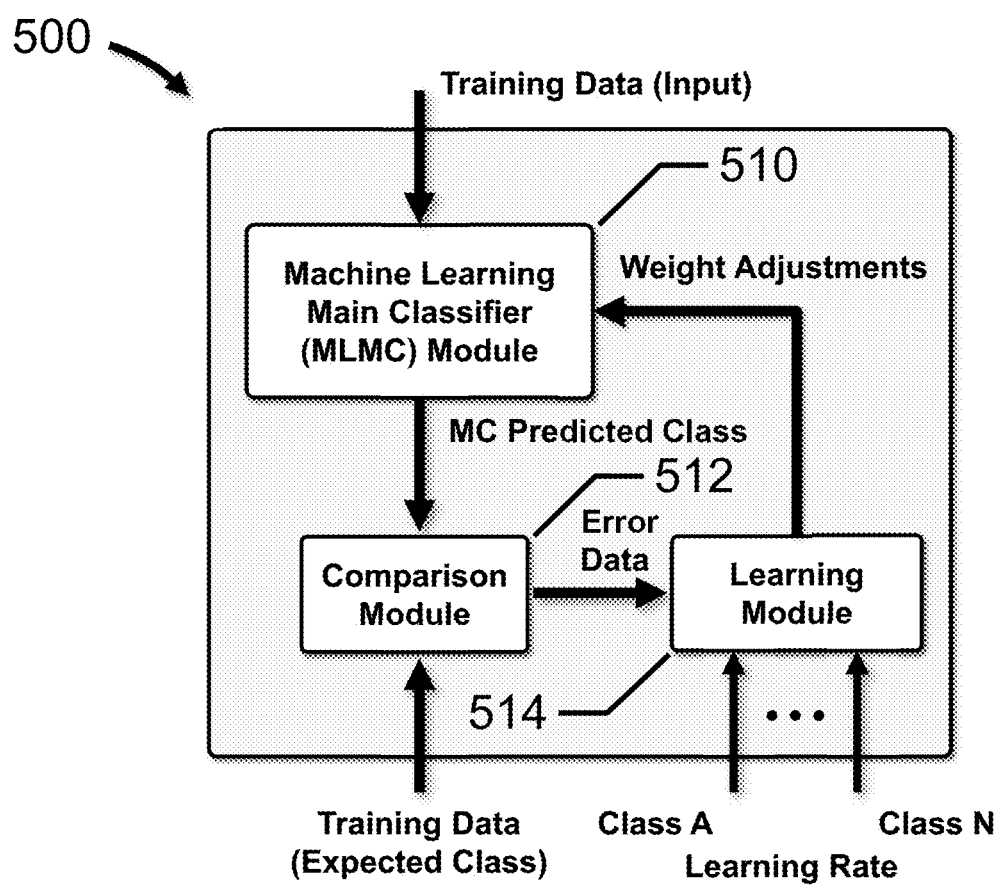
FIG. 5A depicts a block diagram of a training system for a machine learning main classifier (MLMC), in accordance with an embodiment of the present disclosure.

FIG. 5A depicts a block diagram of a training system for a machine learning main classifier (MLMC), in accordance with an embodiment of the present disclosure.

Training system 500 is a computer system that includes one or more processors, a memory, etc., that executes one or more software modules that train the MLMC included within MC module 210. The software modules include MLMC module 510, comparison module 512 and learning module 514. Initially, MLMC module 510 includes an untrained version of the MLMC included within MC module 210. Generally, the MLMC includes one or more SC classes and several non-SC classes.

During each training cycle, MLMC module 510 receives training data (input) and determines an MC predicted class based on the input, comparison module 512 receives and compares the training data (expected class) to the MC predicted class and outputs error data, and learning module 514 receives the error data and the learning rate(s) for all of the classes (i.e., Class A to Class N), and determines and sends the weight adjustments to MLMC module 510.

In certain embodiments, the MLMC may be trained using a single learning rate for all of the classes (i.e., Class A to Class N). When the learning rate is high, the training time is long, and, conversely, when the learning rate is low, the training time may be short but the MLMC may not be as accurate. In one embodiment, learning module 514 provides a supervised learning process to train the MLMC using completely-labeled training data that include known input-output pairs. In another embodiment, learning module 514 provides a semi-supervised or weakly-supervised learning process to train the MLMC using incomplete training data, i.e., a small amount of labeled data (i.e., input-output pairs) and a large amount of unlabeled data (input only). In a further embodiment, learning module 514 provides an unsupervised learning process to train the MLMC using unlabeled data (i.e., input only).

Figure 5B:
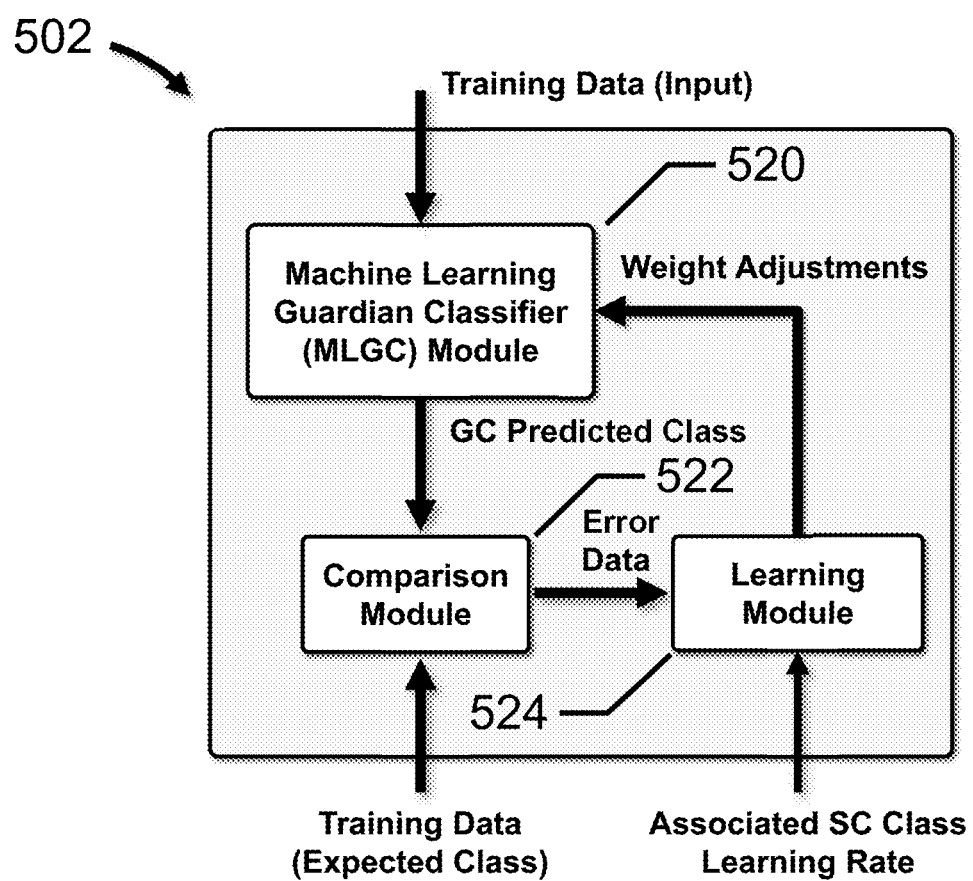
FIG. 5B depicts a block diagram of a training system for a machine learning guardian classifier (MLGC), in accordance with an embodiment of the present disclosure.

FIG. 5B depicts a block diagram of a training process for a machine learning guardian classifier (MLGC), in accordance with an embodiment of the present disclosure.

Training system 502 is a computer system that includes one or more processors, a memory, etc., that executes one or more software modules that train each MLGC included within each GC module 220. The software modules include MLGC module 520, comparison module 522 and learning module 524. Initially, MLGC module 520 includes an untrained version of each MLGC included within each GC module 220. Each MLGC includes one associated SC class and a residual class that includes any non-associated SC classes and the non-SC classes.

During each training cycle for each MLGC, MLGC module 520 receives training data (input) and determines a GC predicted class based on the input, comparison module 522 receives and compares the training data (expected class) to the GC predicted class and outputs error data, and learning module 524 receives the error data and the learning rate for the associated SC class (i.e., one of Class A to Class N), and determines and sends the weight adjustments to MLGC module 520.

As discussed above, the MLMC may be trained using a single learning rate for all of the classes (i.e., Class A to Class N). Advantageously, the MLGC may be trained using a learning rate that is higher than the learning rate of the MLMC due to the simplicity of the MLGC. In certain embodiments, each MLGC associated with a particular SC class may be trained using a learning rate that is based on the priority level of the associated SC class.

In one embodiment, learning module 524 provides a supervised learning process to train the MLGC using completely-labeled training data that include known input-output pairs. In another embodiment, learning module 524 provides a semi-supervised or weakly-supervised learning process to train the MLGC using incomplete training data, i.e., a small amount of labeled data (i.e., input-output pairs) and a large amount of unlabeled data (input only). In a further embodiment, learning module 524 provides an unsupervised learning process to train the MLGC using unlabeled data (i.e., input only).

In one embodiment, MLHA 200 is embedded within a "PlasticArmpit" sensor module. The "PlasticArmpit" sensor module includes 8 sensors, each of which provides 5-bit integer sensor data indicating odor strength. MLHA 200 includes MC module 210 with an MLMC, GC module 220 with an MLGC and FPC decision module 230.

The MLMC is a binary neural network (BNN) that has binary (i.e., 1 bit) weights and activations, and 8 features. The output of the MLMC is a class prediction from one of 5 different classes that indicate odor strength. The untrained MLMC is trained using PlasticArmpit sensor module training data; the average prediction accuracy for at least one set of training data is 91%. The pre-trained MLMC has an 8 node input stage, 20 hidden nodes and 5 output nodes. MLHA 200 implements the pre-trained MLMC in 65 nm.

The MLGC is a feature voting classifier (FVC). In one embodiment, the MLGC is a LUT-based Naïve Bayes classifier; in other embodiments, the MLGC may be a decision tree, gaussian naïve Bayes, etc. The MLGC has 2 classes including a single SC class (i.e., class "A," one of 5 odor strengths) and a residual class that includes the remaining 4 classes (i.e., classes "B," "C," "D," and "E"). The untrained MLGC is trained using PlasticArmpit sensor module training data that is converted to a 2 class representation; the average prediction accuracy for at least one set of training data is 92%. MLHA 200 also implements the pre-trained MLGC in 65 nm.

Table 1 presents the performance and area comparison results of the MLMC and the MLGC.

| Type | Classifier | Accuracy | Gate Count |
|---|---|---|---|
| Main | 5-Class BNN (A, B, C, D, E) | 91% | 1315 |
| Guardian | 2-Class FVC (A, not A) | 92% | 70 |

Advantageously, a relatively small MLGC may be used to guard SC classes that are predicted by the MLMC without sacrificing prediction accuracy. Additionally, there is no need to have a redundant MLMC to increase resiliency. Instead, tiny and specialized MLGCs can be trained and implemented to provide hardware redundancy and diversity.

Embodiments of the present disclosure advantageously provide a safety-based prediction system, apparatus and hardware-based method. The embodiments described above and summarized below are combinable.

In one embodiment, a machine learning hardware accelerator (MLHA) includes a main classifier (MC) module, a guardian classifier (GC) module associated with each SC class, and a final predicted class decision module coupled to the MC module and each GC module. The MC module includes a pre-trained, machine learning main classifier (MLMC) that has at least one safety critical (SC) class and a plurality of non-SC classes, and is configured to predict an MC predicted class based on input data and output the MC predicted class. Each GC module includes a pre-trained, machine learning guardian classifier (MLGC) having two classes including an associated SC class and a residual class that includes any non-associated SC classes and the plurality of non-SC classes. Each GC module is configured to predict a GC predicted class based on the input data and output the GC predicted class. The final predicted class decision module is configured to receive the MC predicted class and each GC predicted class, determine a final predicted class based on the MC predicted class and each GC predicted class, and output the final predicted class.

In another embodiment, a hardware-based method includes predicting, by a main classifier (MC) module, an MC predicted class based on input data, the MC module including a pre-trained, machine learning main classifier (MLMC) having at least one safety critical (SC) class and a plurality of non-SC classes; predicting, by each guardian classifier (GC) module associated with each SC class, a GC predicted class based on the input data, each GC module including a pre-trained, machine learning guardian classifier (MLGC) having two classes including an associated SC class and a residual class that includes any non-associated SC classes and the plurality of non-SC classes; determining, by a final predicted class decision module, a final predicted class based on the MC predicted class and each GC predicted class; and outputting, by the final predicted class decision module, the final predicted class.

In a further embodiment, a system includes a memory configured to store input data including sensor data; a machine learning hardware accelerator (MLHA), coupled to the memory, including a main classifier (MC) module, a guardian classifier (GC) module associated with each SC class, a final predicted class decision module, coupled to the MC module and each GC module, a processor, coupled to the memory and the MLHA, configured to transmit the input data to the MLHA, receive the final predicted class from the MLHA, and control an autonomous process or a semi-autonomous process based on the final predicted class. In one embodiment, the autonomous process or the semi-autonomous process includes an autonomous driving process or a robotic surgical process.

In another embodiment, the MLMC has a plurality of SC classes, and said determine the final predicted class includes when the MC predicted class is a first SC class and the GC predicted class from the GC module associated with the first SC class is the first SC class, select the first SC class as the final predicted class.

In another embodiment, each SC class has an SC priority level, and said determine the final predicted class includes when the MC predicted class is the first SC class and the GC predicted class from the GC module associated with the first SC class is the residual class, when the GC predicted classes from the GC modules not associated with the first SC class are residual classes, select the MC predicted class as the final predicted class, when the GC predicted class from one of the GC modules not associated with the first SC class is a second SC class and any remaining GC predicted classes are residual classes, select the second SC class as the final predicted class, and when the GC predicted classes from two or more of the GC modules not associated with the first SC class are SC classes, order the GC predicted classes based on the SC priority levels, and select the GC predicted class having the highest SC priority level as the final predicted class.

In another embodiment, determine the final predicted class includes, when the MC predicted class is one of the non-SC classes, when all of the GC predicted classes are residual classes, select the MC predicted class as the final predicted class, when one of the GC predicted classes is a second SC class and any remaining GC predicted classes are residual classes, select the second SC class as the final predicted class, and when two or more of the GC predicted classes are SC classes, order the GC predicted classes based on the SC priority levels, and select the GC predicted class having the highest SC priority level as the final predicted class.

In another embodiment, the MLMC has one SC class, and said determine the final predicted class includes when the MC predicted class is the SC class, selecting the SC class as the final predicted class; and when the MC predicted class is one of the non-SC classes, when the GC predicted class is the SC class, selecting the SC class as the final predicted class, and when the GC predicted class is the residual class, selecting the MC predicted class as the final predicted class.

In another embodiment, the MLHA also includes at least one additional GC module associated with the SC class; and a GC predicted class decision module, coupled to the GC modules and the final predicted class decision module, configured to receive each GC predicted class, determine a final GC predicted class based on each GC predicted class, and output the final GC predicted class to the final predicted class decision module, where said determine the final predicted class is based on the MC predicted class and the final GC predicted class.

In another embodiment, determine a final GC predicted class includes when at least half of the GC predicted classes are the SC class, selecting the SC class as the final GC predicted class; and when less than half of the GC predicted classes are the SC class, selecting the residual class as the final GC predicted class.

While implementations of the disclosure are susceptible to embodiment in many different forms, there is shown in the drawings and will herein be described in detail specific embodiments, with the understanding that the present disclosure is to be considered as an example of the principles of the disclosure and not intended to limit the disclosure to the specific embodiments shown and described. In the description above, like reference numerals may be used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive. Also, grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth. References to items in the singular should be understood to include items in the plural, and vice versa, unless explicitly stated otherwise or clear from the text.

Recitation of ranges of values herein are not intended to be limiting, referring instead individually to any and all values falling within the range, unless otherwise indicated, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," "for example," or the like) provided herein, is intended merely to better illuminate the embodiments and does not pose a limitation on the scope of the embodiments. No language in the specification should be construed as indicating any unclaimed element as essential to the practice of the embodiments.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

In the following description, it is understood that terms such as "first," "second," "top," "bottom," "up," "down," "above," "below," and the like, are words of convenience and are not to be construed as limiting terms. Also, the terms apparatus, device, system, etc. may be used interchangeably in this text.

The many features and advantages of the disclosure are apparent from the detailed specification, and, thus, it is intended by the appended claims to cover all such features and advantages of the disclosure which fall within the scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. A machine learning hardware accelerator (MLHA), comprising:
    a main classifier (MC) module, including a pre-trained, machine learning main classifier (MLMC) having at least one safety critical (SC) class and a plurality of non-SC classes, configured to predict an MC predicted class based on input data including sensor data, and output the MC predicted class;
    at least one guardian classifier (GC) module associated with each SC class, each GC module including a pre-trained, machine learning guardian classifier (MLGC) having two classes including an associated SC class and a residual class that includes any non-associated SC classes and the plurality of non-SC classes, each GC module configured to predict a GC predicted class based on the input data, and output the GC predicted class; and
    a final predicted class decision module, coupled to the MC module and each GC module, configured to receive the MC predicted class and each GC predicted class, determine a final predicted class based on the MC predicted class and each GC predicted class, and output the final predicted class,
    where an autonomous process or a semi-autonomous process is controlled based on the final predicted class.

2. The MLHA according to claim 1, where the MLMC has a plurality of SC classes, and said determine the final predicted class includes:
    when the MC predicted class is a first SC class and the GC predicted class from the GC module associated with the first SC class is the first SC class, select the first SC class as the final predicted class.

3. The MLHA according to claim 2, where each SC class has an SC priority level, and said determine the final predicted class includes:
    when the MC predicted class is the first SC class and the GC predicted class from the GC module associated with the first SC class is the residual class,
        when the GC predicted classes from the GC modules not associated with the first SC class are residual classes, select the MC predicted class as the final predicted class,
        when the GC predicted class from one of the GC modules not associated with the first SC class is a second SC class and any remaining GC predicted classes are residual classes, select the second SC class as the final predicted class, and
        when the GC predicted classes from two or more of the GC modules not associated with the first SC class are SC classes, order the GC predicted classes based on the SC priority levels, and select the GC predicted class having the highest SC priority level as the final predicted class.

4. The MLHA according to claim 2, where said determine the final predicted class includes:
    when the MC predicted class is one of the non-SC classes,
        when all of the GC predicted classes are residual classes, select the MC predicted class as the final predicted class,
        when one of the GC predicted classes is a second SC class and any remaining GC predicted classes are residual classes, select the second SC class as the final predicted class, and
        when two or more of the GC predicted classes are SC classes, order the GC predicted classes based on the SC priority levels, and select the GC predicted class having the highest SC priority level as the final predicted class.

5. The MLHA according to claim 1, where the MLMC has one SC class, and said determine the final predicted class includes:
    when the MC predicted class is the SC class, selecting the SC class as the final predicted class; and
    when the MC predicted class is one of the non-SC classes,
        when the GC predicted class is the SC class, selecting the SC class as the final predicted class, and
        when the GC predicted class is the residual class, selecting the MC predicted class as the final predicted class.

6. The MLHA according to claim 5, further comprising:
at least one additional GC module associated with the SC class; and
a GC predicted class decision module, coupled to the GC modules and the final predicted class decision module, configured to receive each GC predicted class, determine a final GC predicted class based on each GC predicted class, and output the final GC predicted class to the final predicted class decision module,
where said determine the final predicted class is based on the MC predicted class and the final GC predicted class.

7. The MLHA according to claim 6, where said determine a final GC predicted class includes:
when at least half of the GC predicted classes are the SC class, selecting the SC class as the final GC predicted class; and
when less than half of the GC predicted classes are the SC class, selecting the residual class as the final GC predicted class.

8. A hardware-based method, comprising:
predicting, by a main classifier (MC) module, an MC predicted class based on input data including sensor data, the MC module including a pre-trained, machine learning main classifier (MLMC) having at least one safety critical (SC) class and a plurality of non-SC classes;
predicting, by each guardian classifier (GC) module associated with each SC class, a GC predicted class based on the input data, each GC module including a pre-trained, machine learning guardian classifier (MLGC) having two classes including an associated SC class and a residual class that includes any non-associated SC classes and the plurality of non-SC classes;
determining, by a final predicted class decision module, a final predicted class based on the MC predicted class and each GC predicted class;
outputting, by the final predicted class decision module, the final predicted class; and
controlling an autonomous process or a semi-autonomous process based on the final predicted class.

9. The hardware-based method according to claim 8, where the MLMC has a plurality of SC classes, and said determining the final predicted class includes:
when the MC predicted class is a first SC class and the GC predicted class from the GC module associated with the first SC class is the first SC class, selecting the first SC class as the final predicted class.

10. The hardware-based method according to claim 9, where each SC class has an SC priority level, and said determining the final predicted class includes:
when the MC predicted class is the first SC class and the GC predicted class from the GC module associated with the first SC class is the residual class,
when the GC predicted classes from the GC modules not associated with the first SC class are residual classes, selecting the MC predicted class as the final predicted class,
when the GC predicted class from one of the GC modules not associated with the first SC class is a second SC class and any remaining GC predicted classes are residual classes, selecting the second SC class as the final predicted class, and
when the GC predicted classes from two or more of the GC modules not associated with the first SC class are SC classes, ordering the GC predicted classes based on the SC priority levels, and selecting the GC predicted class having the highest SC priority level as the final predicted class.

11. The hardware-based method according to claim 9, where said determining the final predicted class includes:
when the MC predicted class is one of the non-SC classes,
when all of the GC predicted classes are residual classes, selecting the MC predicted class as the final predicted class,
when one of the GC predicted classes is a second SC class and any remaining GC predicted classes are residual classes, selecting the second SC class as the final predicted class, and
when two or more of the GC predicted classes are SC classes, ordering the GC predicted classes based on the SC priority levels, and selecting the GC predicted class having the highest SC priority level as the final predicted class.

12. The hardware-based method according to claim 8, where the MLMC has one SC class, and said determining the final predicted class includes:
when the MC predicted class is the SC class, selecting the SC class as the final predicted class; and
when the MC predicted class is one of the non-SC classes,
when the GC predicted class is the SC class, selecting the SC class as the final predicted class, and
when the GC predicted class is the residual class, selecting the MC predicted class as the final predicted class.

13. The hardware-based method according to claim 12, where:
at least one additional GC module is associated with the SC class;
said predicting the GC predicted class includes:
at a GC predicted class decision module coupled to the GC modules and the final predicted class decision module:
receiving each GC predicted class,
determining a final GC predicted class based on each GC predicted class, and
outputting the final GC predicted class to the final predicted class decision module, and
said determining the final predicted class is based on the MC predicted class and the final GC predicted class.

14. The hardware-based method according to claim 13, where said determining a final GC predicted class includes:
when at least half of the GC predicted classes are the SC class, selecting the SC class as the final GC predicted class; and
when less than half of the GC predicted classes are the SC class, selecting the residual class as the final GC predicted class.

15. A system, comprising:
a memory configured to store input data including sensor data;
a machine learning hardware accelerator (MLHA), coupled to the memory, including:
a main classifier (MC) module, including a pre-trained, machine learning main classifier (MLMC) having at least one safety critical (SC) class and a plurality of non-SC classes, configured to predict an MC predicted class based on the input data, and output the MC predicted class;
a guardian classifier (GC) module associated with each SC class, each GC module including a pre-trained, machine learning guardian classifier (MLGC) having two classes including an associated SC class and a residual class that includes any non-associated SC classes and the plurality of non-SC classes, each GC module configured to predict a GC predicted class based on the input data, and output the GC predicted class; and a final predicted class decision module, coupled to the MC module and each GC module, configured to receive the MC predicted class and each GC predicted class, determine a final predicted class based on the MC predicted class and each GC predicted class, and output the final predicted class; and a processor, coupled to the memory and the MLHA, configured to:

transmit the input data to the MLHA, receive the final predicted class from the MLHA, and control an autonomous process or a semi-autonomous process based on the final predicted class.

16. The system according to claim 15, where the MLMC has a plurality of SC classes, each SC class has an SC priority level, and said determine the final predicted class includes:

when the MC predicted class is a first SC class and the GC predicted class from the GC module associated with the first SC class is the first SC class, select the first SC class as the final predicted class; and when the MC predicted class is the first SC class and the GC predicted class from the GC module associated with the first SC class is the residual class, when the GC predicted classes from the GC modules not associated with the first SC class are residual classes, select the MC predicted class as the final predicted class, when the GC predicted class from one of the GC modules not associated with the first SC class is a second SC class and any remaining GC predicted classes are residual classes, select the second SC class as the final predicted class, and when the GC predicted classes from two or more of the GC modules not associated with the first SC class are SC classes, order the GC predicted classes based on the SC priority levels, and select the GC predicted class having the highest SC priority level as the final predicted class.

17. The system according to claim 15, where the MLMC has a plurality of SC classes, and said determine the final predicted class includes:

when the MC predicted class is a first SC class and the GC predicted class from the GC module associated with the first SC class is the first SC class, select the first SC class as the final predicted class; and when the MC predicted class is one of the non-SC classes, when all of the GC predicted classes are residual classes, select the MC predicted class as the final predicted class, when one of the GC predicted classes is a second SC class and any remaining GC predicted classes are residual classes, select the second SC class as the final predicted class, and when two or more of the GC predicted classes are SC classes, order the GC predicted classes based on the SC priority levels, and select the GC predicted class having the highest SC priority level as the final predicted class.

18. The system according to claim 15, where the MLMC has one SC class, and said determine the final predicted class includes:

when the MC predicted class is the SC class, selecting the SC class as the final predicted class; and when the MC predicted class is one of the non-SC classes, when the GC predicted class is the SC class, selecting the SC class as the final predicted class, and when the GC predicted class is the residual class, selecting the MC predicted class as the final predicted class.

19. The system according to claim 18, further comprising:

at least one additional GC module associated with the SC class; and a GC predicted class decision module, coupled to the GC modules and the final predicted class decision module, configured to receive each GC predicted class, determine a final GC predicted class based on each GC predicted class, and output the final GC predicted class to the final predicted class decision module, where said determine the final predicted class is based on the MC predicted class and the final GC predicted class, and includes:

when at least half of the GC predicted classes are the SC class, selecting the SC class as the final GC predicted class, and when less than half of the GC predicted classes are the SC class, selecting the residual class as the final GC predicted class.

20. The system according to claim 15, where the autonomous process or the semi-autonomous process includes an autonomous driving process or a robotic surgical process.

* * * * *